(12) United States Patent
Kim et al.

(10) Patent No.: US 10,372,563 B2
(45) Date of Patent: Aug. 6, 2019

(54) ANALYZING SYSTEM FOR MANAGING INFORMATION STORAGE TABLE AND CONTROL METHOD THEREOF

(71) Applicant: Korea University Research and Business Foundation, Seoul (KR)

(72) Inventors: Seon Wook Kim, Gyeonggi-do (KR); Ho Kwon Kim, Gyeonggi-do (KR); Jae Yung Jun, Seoul (KR); Young Sun Han, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 28 days.

(21) Appl. No.: 15/419,421

(22) Filed: Jan. 30, 2017

(65) Prior Publication Data

US 2017/0364420 A1    Dec. 21, 2017

(30) Foreign Application Priority Data

Jun. 17, 2016  (KR) .................. 10-2016-0075860

(51) Int. Cl.
*G06F 11/00* (2006.01)
*G06F 11/16* (2006.01)
*G06F 12/02* (2006.01)
*G06F 12/10* (2016.01)

(52) U.S. Cl.
CPC ...... *G06F 11/1666* (2013.01); *G06F 12/0292* (2013.01); *G06F 12/10* (2013.01); *G06F 2212/1016* (2013.01); *G06F 2212/1044* (2013.01); *G06F 2212/601* (2013.01); *G06F 2212/657* (2013.01); *G06F 2212/7211* (2013.01)

(58) Field of Classification Search
CPC ............. G06F 11/1666; G06F 11/0727; G06F 11/073; G06F 11/3037; G06F 12/0292; G06F 12/10; G06F 2212/1016; G06F 2212/1044; G06F 2212/601; G06F 2212/657; G06F 2212/7211
See application file for complete search history.

(56) References Cited

U.S. PATENT DOCUMENTS

2005/0216695 A1*  9/2005  Bono ................. G06F 12/109
                                                 711/203
2012/0185667 A1*  7/2012  Gandhi ............. G06F 12/1009
                                                 711/203

(Continued)

*Primary Examiner* — Joseph D Manoskey
(74) *Attorney, Agent, or Firm* — Fox Rothschild LLP

(57) ABSTRACT

Disclosed are an analyzing system for managing an information storage table and a control method thereof. That is, each of the physical basic regions, which are units of hashing an information storage position, is divided into a plurality of physical sub regions having same size. Then, a combination of virtual basic regions which satisfy a predetermined target value is checked from all configurable combinations and a hash value related with the combination of the virtual basic regions which satisfies the checked target value is stored in a predetermined region of a memory. Therefore, even though an information storage space required for every unit region is overloaded, when there is an extra information storage space in another region, the information storage space having an extra space is used to maximize efficiency of the information storage space.

17 Claims, 12 Drawing Sheets

(56) References Cited

U.S. PATENT DOCUMENTS

2012/0191900 A1* 7/2012 Kunimatsu ......... G06F 12/0223
 711/103
2014/0281366 A1* 9/2014 Felch .................. G06F 12/0886
 711/207
2015/0370495 A1* 12/2015 Georgiev .............. G06F 3/0641
 711/114

* cited by examiner

UNIT REGION

|   | 0 | 1 | 2 | 3 |
|---|---|---|---|---|
| 0 |   | X | X | X |
| 1 |   |   |   |   |
| 2 |   |   |   |   |
| 3 |   |   |   |   |

UNIT REGION

X : FAULT

FIG. 3

ANALYZING SYSTEM FOR MANAGING INFORMATION STORAGE TABLE AND CONTROL METHOD THEREOF

CROSS-REFERENCE TO RELATED APPLICATION

This application claims the benefit of Korean Application No. 10-2016-0075860 filed on Jun. 17, 2016 with the Korean Intellectual Property Office, the disclosure of which is incorporated herein by reference.

BACKGROUND

1. Field of the Invention

The present solution relates to an analyzing system for managing an information storage table and a control method thereof, and more particularly, to an analyzing system for managing an information storage table which maps unit regions hashing an information storage location in an information storage table configured by a plurality of unit regions to physical basic regions and divides the mapped physical basic regions into a plurality of physical sub regions having same size, and recombines the plurality of physical sub regions with a plurality of physical sub regions in another unit region to be configured as a plurality of virtual basic regions and a plurality of virtual sub regions, and a control method thereof.

2. Description of the Related Art

In a system having an information storage table configured by a plurality of unit regions, a space for storing information is used for every unit region.

In this case, when a space which is necessary to store the information is not used or processed in a specific unit region due to insufficient space of the region, performance degradation or malfunction of the entire system may occur.

SUMMARY

The present solution has been made in an effort to provide an analyzing system for managing an information storage table which maps a unit region hashing an information storage location in an information storage table configured by a plurality of unit regions to a physical basic region, checks a combination of a virtual basic region which satisfies a predetermined target value among all configurable combinations while dividing the mapped physical basic region into a plurality of physical sub regions with the same size, stores position information related with the combination of the virtual basic region which satisfies the checked target value, and stores information (or data) corresponding to position information related with the combination of the virtual basic regions which satisfy the stored target value in the information storage table, and a control method thereof.

According to an aspect of the present solution, there is provided a control method of an analyzing system for managing an information storage table. The control method includes: mapping unit regions which hash an information storage location in the information storage table to $2^M$ physical basic regions, by means of an analyzing device; dividing each of the $2^M$ physical basic regions into $2^N$ physical sub regions, by means of the analyzing device, each of the $2^N$ physical sub regions having same size; recombining the divided $2^{M+N}$ physical sub regions to $2^K$ virtual basic regions and dividing each of the $2^K$ virtual basic regions into $2^{M+N-K}$ virtual sub regions, by means of the analyzing device, each of the $2^K$ virtual basic regions having same size and each of the $2^{M+N-K}$ virtual sub regions having same size; checking whether number of information to be stored in the virtual basic regions satisfies a predetermined target value, by means of the analyzing device; storing, when the number of information to be stored in the virtual basic regions satisfies the predetermined target value, position information of K bits related with the virtual basic regions which satisfies the predetermined target value among M+N bits and position information of M+N−K bits related with the virtual sub regions which satisfies the predetermined target value in a predetermined storage region in a storage medium, by means of the analyzing device; and storing data corresponding to the position information of K bits and the position information of M+N−K bits in the storage region in the information storage table, by means of the analyzing device, in which M, N, and K are natural numbers and K may be equal to or smaller than M+N.

In some scenarios, the mapping of the unit regions to the $2^M$ physical basic regions may include: adding, when a basic region which stores and manages information in the memory system is a bank, all rows in one bank to be one, by means of the analyzing device; dividing all added rows into the $2^M$ physical basic regions, by means of the analyzing device; and mapping the unit regions to the divided $2^M$ physical basic regions, by means of the analyzing device.

In those or other scenarios, the mapping of the unit regions to the $2^M$ physical basic regions may include: performing, when number of the unit regions is not $2^M$, a preprocessing process of mapping an existing unit region to $2^M$ new unit regions, by means of the analyzing device; and mapping the $2^M$ preprocessed unit regions to the $2^M$ physical basic regions.

In those or other scenarios, the recombining of the divided $2^{M+N}$ physical sub regions to the $2^K$ virtual basic regions and dividing each of the $2^K$ virtual basic regions into the $2^{M+N-K}$ virtual sub regions may include: combining the divided $2^{M+N}$ physical sub regions and setting a key value of the $2^K$ virtual basic regions in a unit of bit which is set in advance from a most significant bit to a least significant bit among the M+N bits of the $2^M+^N$ physical sub regions, by means of the analyzing device; and setting a bit remaining after setting the key value of the $2^K$ virtual basic regions among the M+N bits as a key value of the $2^{M+N-K}$ virtual sub regions to configure a key of the entire virtual basic region.

In those or other scenarios, the target value may be a predetermined value corresponding to the information to be stored and same with a number of resources which are available in all of the mapped physical basic regions.

In those or other scenarios, in the case of a memory system which avoids a fault memory block, the target value may be a predetermined value corresponding to the information to be stored and same with a number of memory blocks which are available in all of the physical basic regions of the memory system.

In those or other scenarios, a value of the position information of K bits and a value of the position information of M+N−K bits may be configured as a vector and positions of the bits are configured by "0" corresponding to a position of K bit which is a key value of the virtual basic regions and "1" corresponding to a position of M+N−K bits which is a key value of the virtual sub regions.

In those or other scenarios, the storing of position information of K bits and position information of M+N−K bits in the predetermined storage region of the storage medium may include: generating a position of K bits corresponding to a virtual basic region which satisfies the target value, among the M+N bits, by means of the analyzing device; generating a position of M+N−K bits corresponding to a virtual sub region which satisfies the target value, by means of the analyzing device; and storing the generated position of K bits and the generated position of M+N−K bits in a predetermined storage area of the storage medium as a vector, by means of the analyzing device.

In those or other scenarios, in the case of a memory system which applies memory repair using a redundant cell, the data may be position information of a fault cell which is replaced by a spare cell which is provided in the memory system.

In those or other scenarios, the control method may further include a first step of when as the checking result, the number of information to be stored in the virtual basic region does not satisfy the predetermined target value, recombining the plurality of physical sub regions for another position information of K bits, excluding a previously combined case among the number of combinationable cases for the plurality of physical sub regions, by means of the analyzing device, to generate the recombined virtual basic region; a second step of resetting each of the recombined virtual basic regions to be virtual sub regions with the same size, by means of the analyzing device; and a third step of repeatedly performing the first step and the second step until the number of information to be stored in the recombined virtual basic region satisfies the target value, by means of the analyzing device.

In those or other scenarios, the method may further include determining, when the target value is not satisfied for all combinations of positions of K bits among M+N bits, that the data cannot be stored and ending the entire processes, by means of the analyzing device.

According to another aspect of the present solution, there is provided an analyzing system for managing an information storage table. The analyzing system includes the information storage table which is managed for every unit region; and an analyzing device which maps unit regions which hash an information storage location in the information storage table to $2^M$ physical basic regions, divides each of the $2^M$ physical basic regions into $2^N$ physical sub regions having same size, recombines the divided $2^{M+N}$ physical sub regions to $2^K$ virtual basic regions having same size and divides each of the $2^K$ virtual basic regions into $2^{M+N-K}$ virtual sub regions having same size, checks whether number of information to be stored in the virtual basic regions satisfies a predetermined target value, when the number of information to be stored in the virtual basic regions satisfies the predetermined target value, stores position information of K bits related with the virtual basic regions which satisfies the predetermined target value among M+N bits and position information of M+N−K bits related with the virtual sub regions which satisfies the target value in a predetermined storage region in a storage medium, and stores data corresponding to the position information of K bits and the position information of M+N−K bits stored in the storage region in the information storage table, in which M, N, and K are natural numbers and K may be equal to or smaller than M+N.

In some scenarios, when a basic region which stores and manages information in the memory system is a bank, the analyzing device adds all rows in one bank to be one, divides all the added rows into the $2^M$ physical basic regions, and maps the unit regions to the divided $2^M$ physical basic regions.

In those or other scenarios, when number of the unit regions is not $2^M$, the analyzing device may perform a preprocessing process of mapping an existing unit region to $2^M$ new unit regions, by means of the analyzing device; and map the $2^M$ preprocessed unit regions to the $2^M$ physical basic regions.

In those or other scenarios, the analyzing device may combine the divided $2^{M+N}$ physical sub regions and set a key value of the $2^K$ virtual basic regions in a unit of bit which is set in advance from a most significant bit to a least significant bit among the M+N bits of the $2^{M+N}$ physical sub regions and set a bit remaining after setting the key value of the $2^K$ virtual basic regions among the M+N bits as a key value of the $2^{M+N-K}$ virtual sub regions to configure a key of the entire virtual regions.

In those or other scenarios, the target value may be a predetermined value corresponding to the information to be stored and same with a number of resources which are available in all of the mapped physical basic regions.

In those or other scenarios, in the case of a memory system which avoids a fault memory block, the target value may be a predetermined value corresponding to the information to be stored and same with a number of memory blocks which are available in all of the physical basic regions of the memory system.

In those or other scenarios, the analyzing device may perform a first step of when the number of information to be stored in the virtual basic regions does not satisfy the predetermined target value, recombining the physical sub regions for another position information of K bits, excluding a previously combined case among the number of combinationable cases for the physical sub regions, by means of the analyzing device, to generate the recombined virtual basic regions; a second step of resetting each of the recombined virtual basic regions to be virtual sub regions having same size; and repeatedly perform the first step and the second step until the number of information to be stored in the recombined virtual basic regions satisfies the target value, by means of the analyzing device.

In those or other scenarios, when the target value is not satisfied for all combinations of positions of K bits among M+N bits, the analyzing device may determine that the data cannot be stored and end the entire processes.

In those or other scenarios, it is possible to map unit regions hashing an information storage location in an information storage table configured by a plurality of unit regions to physical basic regions, check a combination of virtual basic regions which satisfy a predetermined target value among all configurable combinations while dividing the mapped physical basic regions into a plurality of physical sub regions having same size, store position information related with the combination of the virtual basic regions which satisfy the checked target value, and store information (or data) corresponding to position information related with the combination of the virtual basic regions which satisfy the stored target value in the information storage table, thereby improving a performance of the entire system by uniformly utilizing the entire information storage space in every region and maximizing efficiency of the information storage space by utilizing the information storage space.

Further, in the system configured by a plurality of unit regions, the physical basic regions are divided into physical sub regions to be a smaller unit and optimal hashing is applied, so that the space which is necessary to store the information is not concentrated in some of unit regions. Therefore, the information storage space necessary for a specific region is managed together with other regions to increase availability of the entire system without having additional information storage space. Further, a problem in that information which needs to be stored in the information storage table configured by the plurality of unit regions is generated in a small number of specific regions, which lowers the availability of the entire system is solved.

BRIEF DESCRIPTION OF DRAWINGS

FIGS. 3, 4 and 5 are views illustrating an example of configuring the most optimal cache memory when 4-way set-associative cache is implemented using 4×4 memory blocks including a fault block.

DETAILED DESCRIPTION

Figure 1:
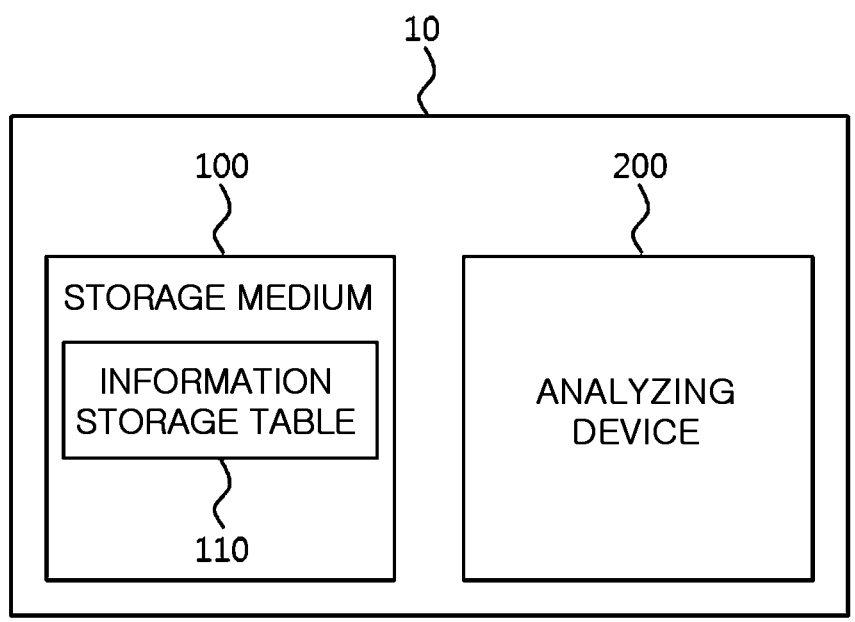
FIG. 1 is a block diagram illustrating a configuration of an entire analyzing system configured by an information storage table configured by a plurality of unit regions and an analyzing device which finds out optimal information storage.

It should be noted that technical terminologies used in the present invention are used to describe a specific exemplary embodiment but are not intended to limit the present invention. Further, the technical terminologies which are used in the present invention should be interpreted to have meanings that are generally understood by those with ordinary skill in the art to which the present invention pertains, unless specifically defined to have different meanings in the present invention, but not be interpreted as an excessively comprehensive meaning or an excessively restricted meaning. Further, if a technical terminology used in the present invention is an incorrect technical terminology which does not precisely describe the spirit of the present invention, the technical terminology should be replaced with and understood as a technical terminology which may be correctly understood by those skilled in the art. Further, a general terminology used in the present invention should be interpreted as defined in a dictionary or in accordance with the context, but not be interpreted as an excessively restricted meaning.

A singular form used in the present invention may include a plural form unless it has a clearly opposite meaning in the context. Terminologies such as "be configured by" or "include" in the present invention should not be interpreted to necessarily include all of plural components or plural steps described in the present invention, but should be interpreted not to include some of the components or steps or to further include additional components or steps.

Further, terminologies including an ordinal number such as first or second which is used in the present invention may be used to explain components, but the components are not limited by the terminologies. The terminologies are used only for distinguishing one component from another component. For example, without departing from the scope of the present invention, the first component may be referred to as the second component, and similarly, the second component may also be referred to as the first component.

Hereinafter, the present solution will be described in detail with reference to the accompanying drawings, and the same or similar components are denoted by the same reference numerals regardless of reference numerals, and repeated description thereof will be omitted.

In describing the present disclosure, when it is determined that a detailed description of a related publicly known technology may obscure the gist of the present disclosure, the detailed description thereof will be omitted. Further, it is noted that the accompanying drawings are used just for easily appreciating the spirit of the present disclosure and it should not be interpreted that the spirit of the present disclosure is limited by the accompanying drawings.

FIG. 1 is a block diagram illustrating a configuration of an entire analyzing system 10 configured by an information storage table configured by a plurality of unit regions and an analyzing device which finds out optimal information storage.

As illustrated in FIG. 1, the analyzing system 10 is configured by a storage medium 100 and an analyzing device 200. However, all the components of the analyzing system 10 illustrated in FIG. 1 are not essential components, but the analyzing system 10 may be implemented by more components or less components than the components illustrated in FIG. 1.

The storage medium 100 may be any one of a dynamic random access memory (DRAM), a random access memory (RAM), a static random access memory (SRAM), a read-only memory (ROM), an electrically erasable programmable read-only memory (EEPROM), a programmable read-only memory (PROM), a phase change memory (PCM), and a magnetorresistane random access memory (MRAM).

Further, the storage medium 100 includes an information storage table 110.

The information storage table 110 is configured by information related with physical regions (or address information related with physical regions), information related with virtual regions (or address information related with virtual regions), and data (or information). Here, the information related with the physical regions includes position information of a plurality of physical basic regions and position information of a plurality of physical sub regions. Here, the information related with the virtual regions includes position information of a plurality of virtual basic regions and position information of a plurality of virtual sub regions. In this case, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies memory repair using a redundant cell, the data (or information) may be a position (or position information) of a fault cell which is replaced by a spare cell which is provided in the memory system.

The analyzing device 200 performs an overall control function of the analyzing system 10.

Further, the analyzing device 200 finds out an optimal information storage location (or position information of K bits and position information of M+N−K bits which satisfy a predetermined target value) of the analyzing system 10 and allocates the position information of the K bits and the position information of M+N−K bits corresponding to the found optimal information storage location to the analyzing system 10.

Further, the analyzing device 200 maps an information management unit regions (or unit regions), which hash the information storage location, to the physical basic regions in the information storage table 110. Here, the information storage table 110 is included in the storage medium 100 and configured by a plurality of unit regions.

In this case, when a basic region in which the information is to be stored and managed in the memory system such as a DRAM, a PCM, an MRAM, or a SRAM is a bank, the analyzing device 200 combines all rows in one bank, divides all the combined rows into $2^M$ physical basic regions, and maps the unit regions to the divided $2^M$ physical basic regions.

Further, when the number of unit regions to be managed in the storage medium 100 is not $2^M$, the analyzing device 200 may make a plurality of unit regions in the storage medium 100 to be $2^M$, and then map the $2^M$ unit regions to the $2^M$ physical basic regions. Here, M may be a natural number.

That is, in order to configure $2^M$ unit regions according to the design of the designer, when the number of unit regions is not $2^M$, the analyzing device 200 performs a preprocessing process of mapping existing unit regions to $2^M$ new unit regions according to the design of the designer and maps the $2^M$ unit regions which are preprocessed to the physical basic regions.

Further, the analyzing device 200 divides the plurality of physical basic regions in the storage medium 100 (or the information storage table 110) into a plurality of physical sub regions. Each of the plurality of physical sub regions has same size.

That is, further, the analyzing device 200 divides $2^M$ physical basic regions in the storage medium 100 (or the information storage table 110) into $2^N$ physical sub regions. Here, N may be a natural number. In this case, when one physical basic region is divided into N physical sub regions to be hashed, an additional bit may be necessary to index the physical sub regions.

Further, the analyzing device 200 combines (or configures) $2^{M+N}$ physical sub regions indexed by M+N bits to generate $2^K$ virtual basic regions. In this case, K is a natural number and may be equal to or smaller than M+N. Here, when bits for approaching the physical basic regions are M bits and bits for approaching the physical sub regions are N bits, a number of combinationable cases to generate the virtual basic regions is M+NCM+N−K. Further, the size of K may be a bit rate to approach the information storage table 110.

Further, the analyzing device 200 divides (or resets) the generated $2^K$ virtual basic regions into $2^{M+N-K}$ virtual sub regions having same size.

That is, the analyzing device 200 combines the physical sub regions to set a key value of the virtual basic regions in the unit of bit which is set in advance from the most significant bit to the least significant bit and sets a bit (or a remaining region) remaining after setting the key value of the virtual basic regions among the M+N bits as a key value of the virtual sub regions to configure the key of the entire virtual region. The entire virtual regions includes the virtual basic regions and virtual sub regions. Here, the analyzing device 200 generates position information of the K bits for obtaining the key value of the virtual basic regions and position information of M+N−K bits for obtaining the key value of the virtual sub regions, in order to configure the key (or a key of the entire virtual regions) of the virtual regions.

As described above, the analyzing device 200 may configure a hash function for obtaining (or setting) the key value of the virtual basic regions using the position information of the K bits among the M+N bits and for obtaining the key value of the virtual sub regions using position information of a bit remaining after setting the key value of the virtual basic regions among the M+N bits. Here, the hash function provides position information (for example, including position information of K bits and position information of M+N−K bits) related with the virtual regions based on physical regions addresses.

Further, the analyzing device 200 checks (or determines) whether a number (or a number of combined/recombined information) of information to be stored in the virtual basic regions (or a combination of the virtual basic regions) which is temporarily combined (or configured) satisfies a predetermined target value. Here, the target value is a value (or a value to satisfy the information to be stored) which is set in advance corresponding to information to be stored. In the case of a memory system which applies memory repair (or memory recovery) using a redundant cell, the target value may be a predetermined number (for example, the number of spare rows and the number of spare columns) which is same with the number of available (or available in the memory system) spare cells which are provided in the memory cell. That is, the target value may be same with the number of resources which may be available in all mapped physical basic regions with a predetermined value corresponding to the information to be stored. Further, in the case of a memory system which avoids a fault memory block, the target value may be same with the number of memory blocks which are available in all of the physical basic regions of the memory system.

As a checking result (or a determining result), when the number of information to be stored in the combined (or configured/generated) virtual basic regions (or a combination of the virtual basic regions) satisfies a predetermined target value, the analyzing device 200 stores the position information of K bits related with the virtual basic regions which satisfies the target value among the M+N bits and the position information of M+N−K bits related with the virtual sub regions which satisfies the target value in a predetermined (or a predetermined allocated) storage region in the storage medium 100. Here, a value of the position information of K bits and a value of the position information of M+N−K bits are configured as a vector and positions of the bits are configured by "0" (or K bits) corresponding to the key value (or a position of K bit) of the virtual basic regions and "1" (or M+N−K bits) corresponding to the key value (or a position of M+N−K bits) of the virtual sub regions.

That is, when the number of information to be stored in the combined (or configured/generated) virtual basic regions (or a combination of the virtual basic regions) satisfies a predetermined target value, the analyzing device 200 generates a position of K bits corresponding to the virtual basic regions which satisfies the target value among the M+N bits and a position of M+N−K bits corresponding to the virtual sub regions which satisfies the target value. Further, the analyzing device 200 stores the generated position (or position information of K bits) of K bits and the generated position (or position information of M+N−K bits) of M+N−K bits in as a vector in a predetermined storage region in the storage medium 100.

Further, the analyzing device 200 determines that the information storage table 110 may be successfully managed, based on the position information (or position information of K bits related with the virtual basic regions which satisfies the target value) of K bits and the position information (or position information of M+N−K bits related with the virtual sub regions which satisfies the target value) of M+N−K bits stored in the predetermined storage region in the storage medium 100 and stores data corresponding to the position information (or position information for the virtual regions) of the virtual regions in the information storage table 110. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

Further, as a checking result (or a determining result), when the number of information to be stored in the combined (or configured/generated) virtual basic regions (or a combination of the virtual basic regions) does not satisfy a predetermined target value, the analyzing device 200 repeatedly performs processes of recombining the plurality of physical sub regions according to a predetermined hashing method (or based on a predetermined hash function/with respect to a position of another K bits) excluding a previously combined case (or a plurality of cases combined/recombined according to the hashing method) among the number of combinationable cases (for example, M+NCM+N−K) to check the recombined virtual basic regions and checking whether the number of information to be stored in the checked recombined virtual basic regions satisfies the predetermined target value.

As described above, the analyzing device 200 checks a first combination of physical sub regions which satisfy a target value to be designed by the virtual basic regions in all configurable combinations for the plurality of physical sub regions.

Further, when the target value is not satisfied for all combinations of positions of K bits among M+N bits, the analyzing device 200 determines that the data cannot be stored (or the information storage table 110 cannot be successfully managed) and ends the entire processes.

Figure 4:
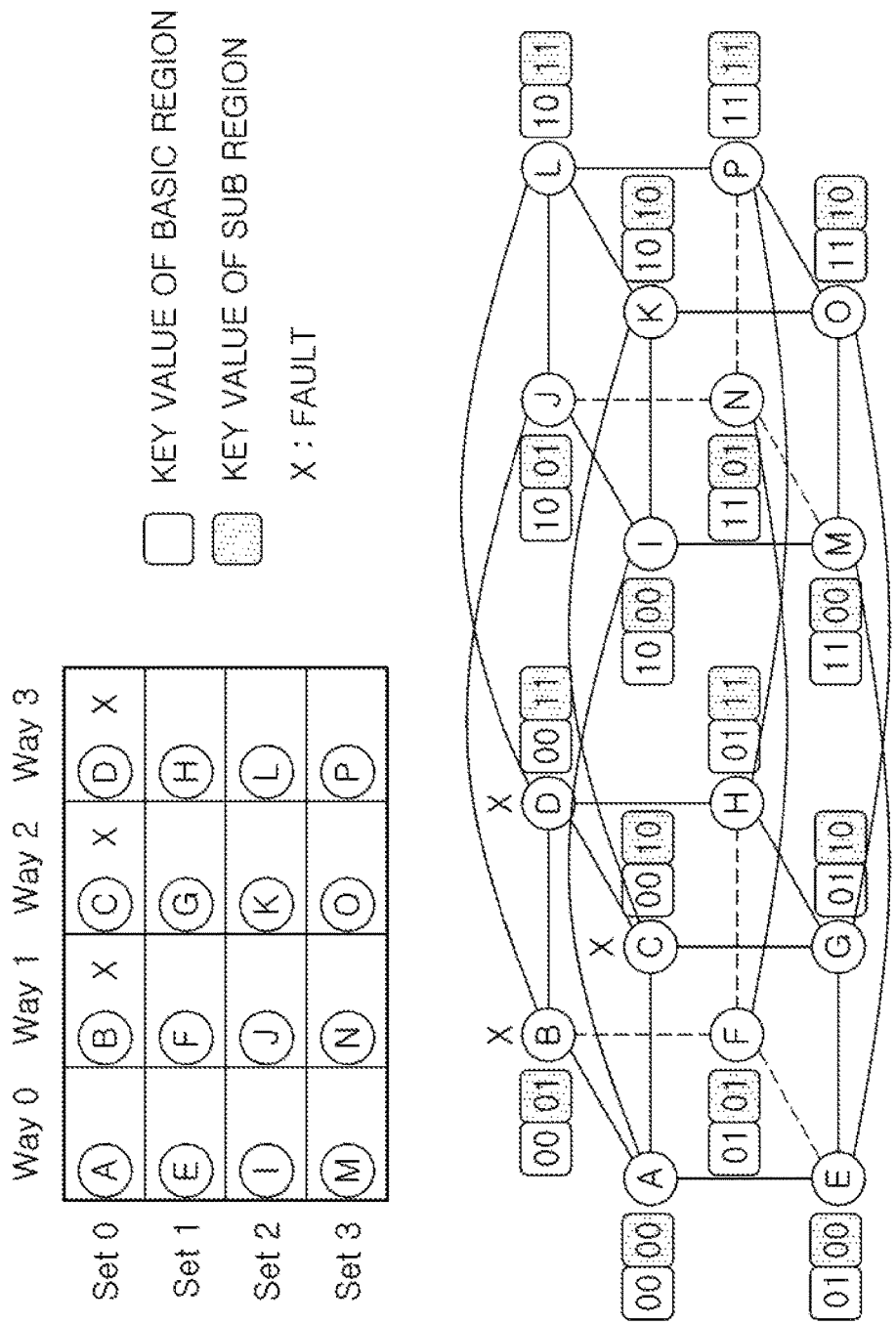
Figure 5:
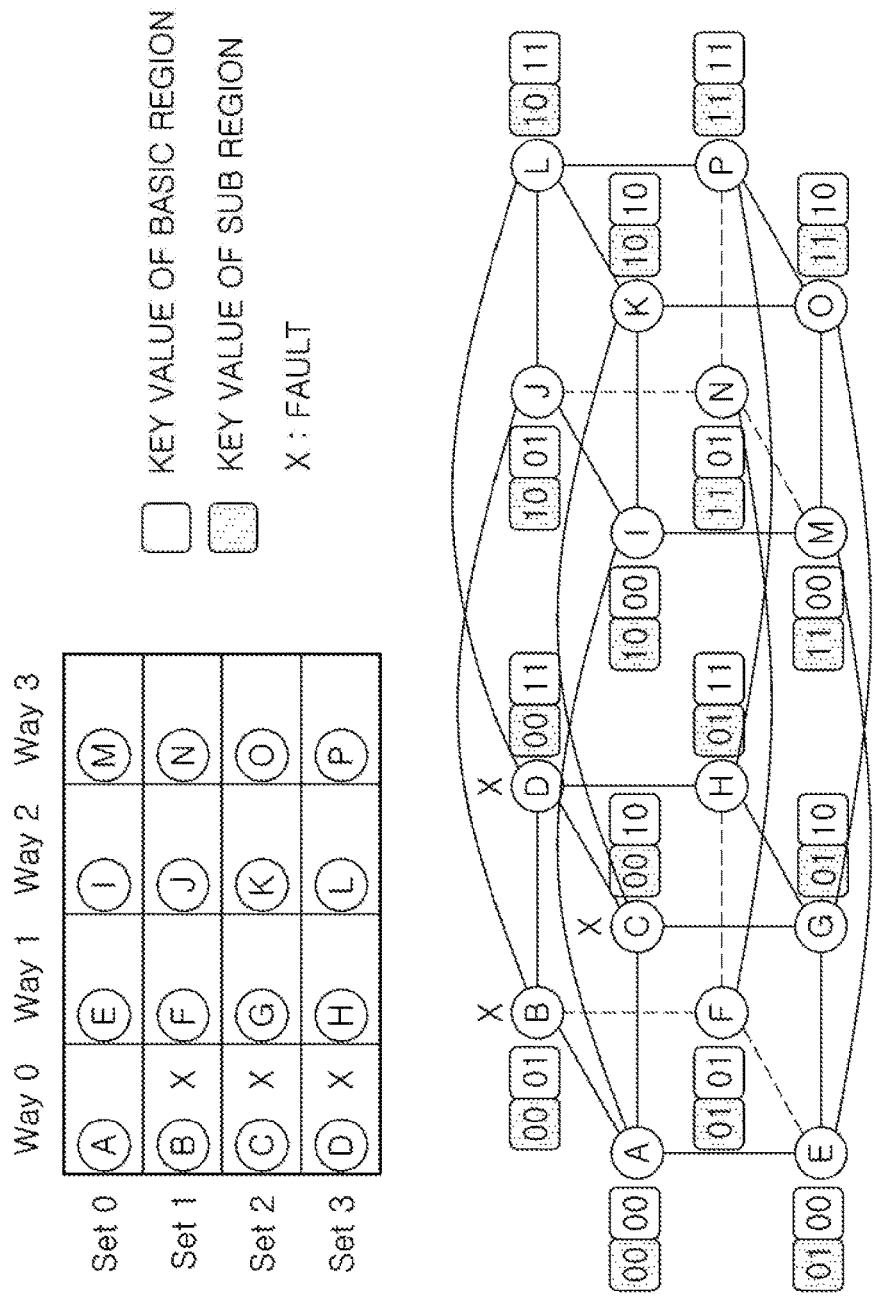

FIGS. 3 to 5 are views illustrating an example of configuring the most optimal cache memory when 4-way set-associative cache is implemented using 4×4 memory blocks including a fault block. Since three blocks among a total of 16 memory blocks have errors, when the 4-way set-associative cache is configured, a target value (or a designed target value) is to allocate one error to each set.

Further, since the cache is 4-way set-associative cache, K is 2.

Further, as illustrated in FIG. 3, when a 4-way cache memory is to be configured, the analyzing device 200 maps unit regions configured by row addresses to physical basic regions to configure four physical basic regions and configure each of the physical basic regions with four physical sub regions.

Therefore, the analyzing device 200 applies hashing with a total of four bits of higher two bits approaching a physical basic region and lower two bits approaching a physical sub region in the approached physical basic region to approach the physical sub region.

Further, as illustrated in FIG. 4, when the hashing is performed with the virtual basic regions (or the physical basic region), three fault blocks are allocated at the time of approaching a set 0, so that a target value is not satisfied.

Further, as illustrated in FIG. 5, when among four bits which approaches the physical sub region to hash the virtual basic region, the lower two bits are used as an address (or the position information of K bit) to approach the virtual basic region and the upper two bits are used as an address (or the position information of M+N−K bits) to approach the virtual sub region in the virtual basic region, it is managed that one fault block is generated in each virtual basic region. Therefore, the target value may be satisfied. As a result, performance degradation of the entire system is minimized so that the cache memory may be configured to show optimal performance.

Figure 6:
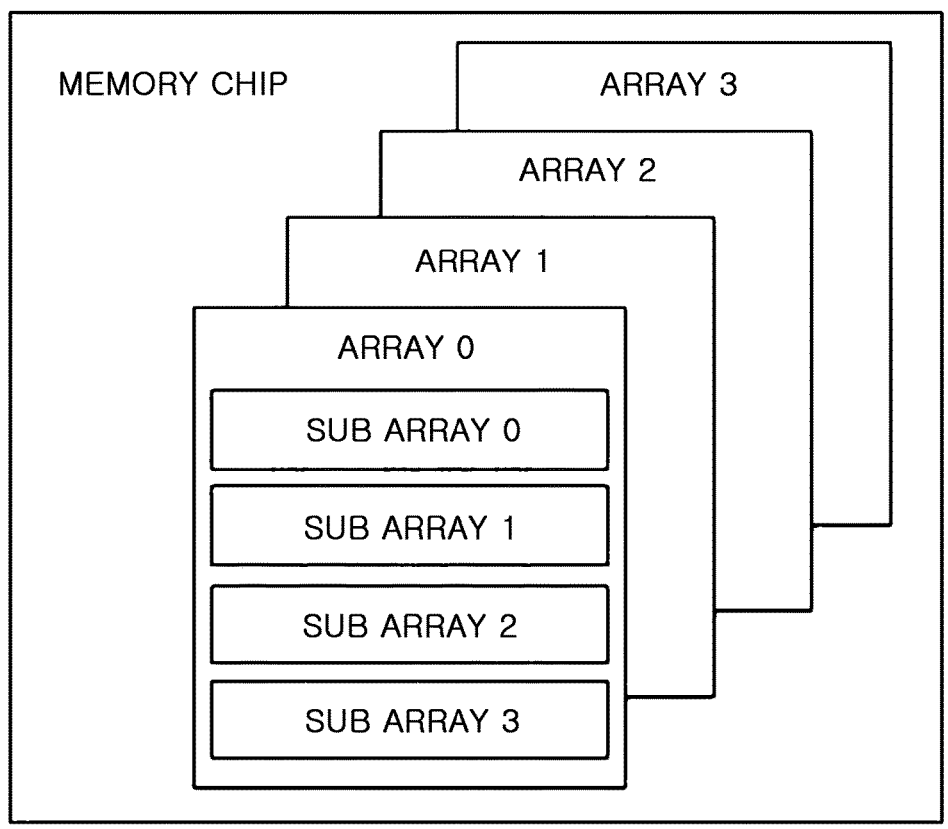
FIGS. 6, 7 and 8 are views illustrating an example which applies the present solution to a step of storing a fault address in a memory chip such as a DRAM.
Figure 7:
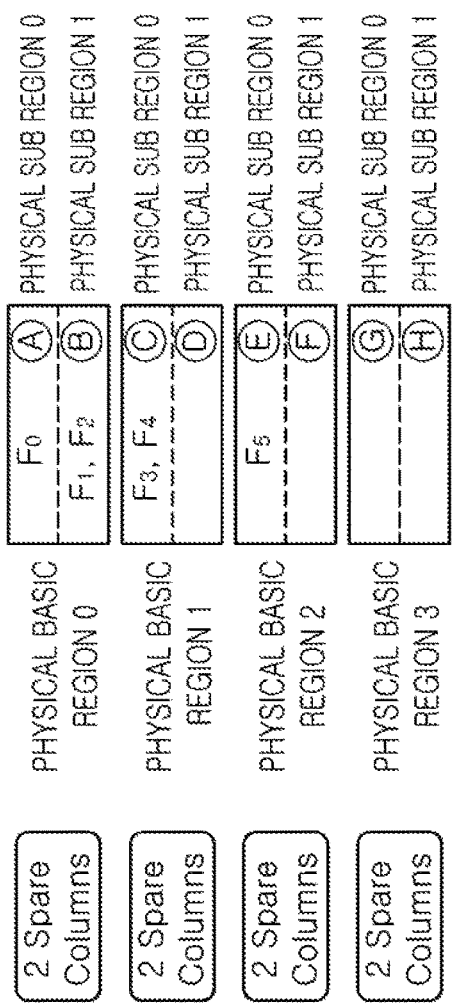
Figure 7:
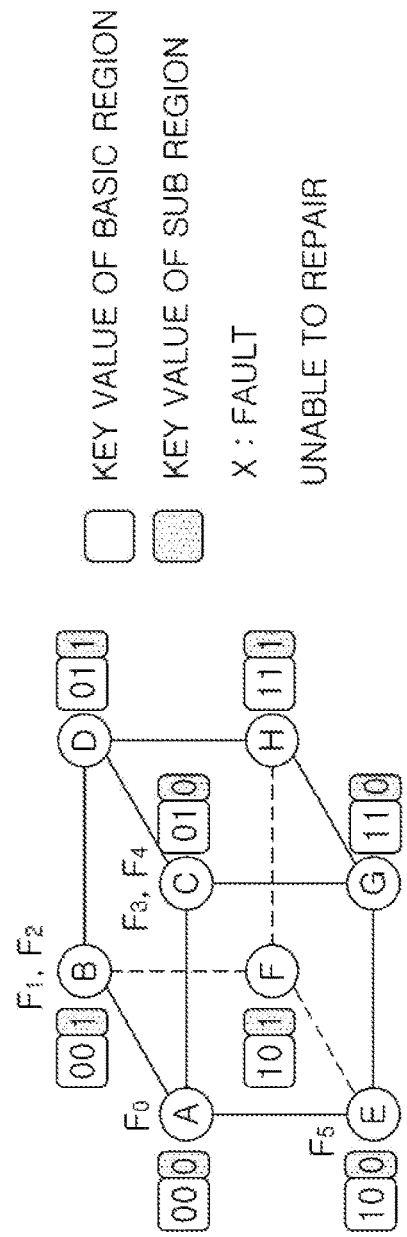
Figure 8:
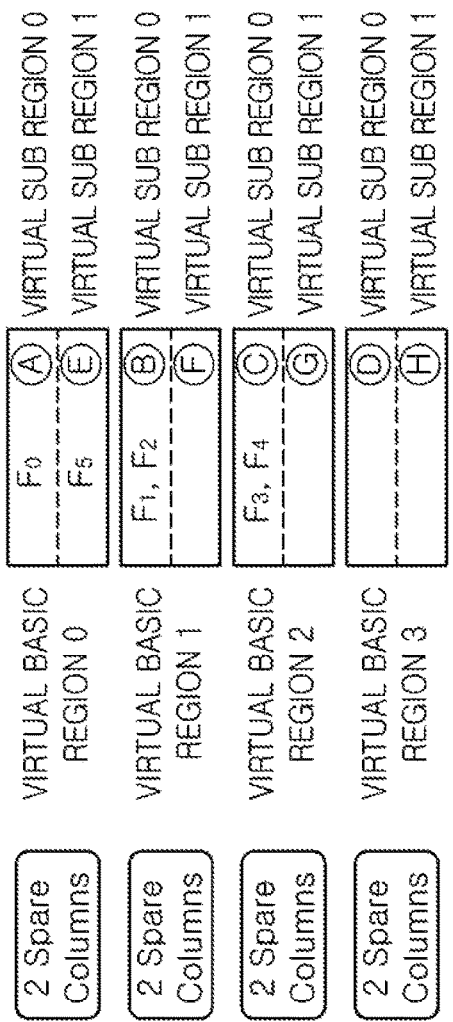
Figure 8:
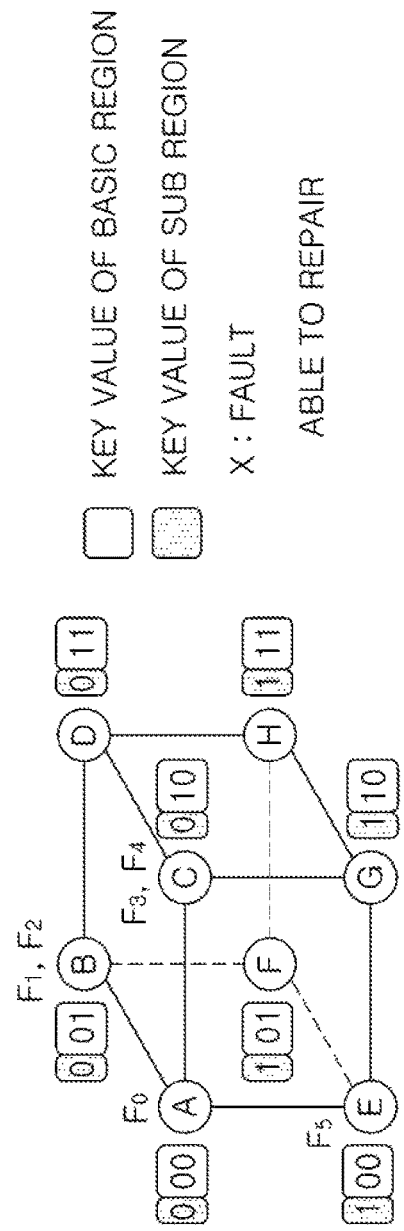

FIGS. 6 to 8 are views illustrating an example which applies the present solution to a step of storing a fault address in a memory chip such as a DRAM.

Further, as illustrated in FIG. 6, the DRAM memory chip is configured by a plurality of arrays.

Further, the array is configured by a plurality of sub arrays with a smaller size than that of the array.

When a fault is generated in the memory chip configured as described above, in order to perform repair while storing and managing an address where the fault is generated, the repair is performed on one sub array or on a plurality of sub arrays.

Therefore, in the related art, even though there is a sub array having a remaining space to store the fault address in the array, the remaining space cannot be used to store the fault address in other sub arrays. However, a storage space of the fault address of the sub array which remains in the array is utilized so that a storage space in the memory may be continuously used.

Further, when the DRAM memory chip illustrated in FIG. 6 is applied to the present solution, the sub array in the array serves as a unit region of the present solution and the unit region serves as a physical basic region. The physical sub region in the physical basic region is obtained by dividing the sub array by the number of physical sub regions.

Further, since the fault is managed and cured (or recovered) for every physical basic region, an entry number of the information storage table 110 for managing a fault address is equal to the number of physical basic region. As a result, K is 2.

Further, when the sub arrays in the array have different sizes, the sub arrays are added to be one and the added sub arrays are divided into $2^M$ virtual sub arrays having same size and the divided virtual sub arrays are mapped to the physical sub arrays.

Further, when it is assumed that a number of faults which is repaired by one sub array is 2, 2 is a target value. Further, since a total of three faults are generated in addresses F0, F1, and F2 in a physical basic region 0 (or a sub array 0) illustrated in FIG. 7, the number of faults to be repaired for the sub array 0 is 3, which exceeds two faults which can be repaired by one sub array.

That is, as illustrated in FIG. 7, two faults are repaired for every physical basic region and a total number of physical basic regions is four so that eight fault addresses at the most may be managed. However, a state may incur in which the faults can not be repaired even when the total number of faults F0 to F5 is six.

As described above, FIG. 7 illustrates an example that divides each physical basic region into two physical sub regions to be combined as virtual basic regions.

That is, the analyzing device 200 divides each physical basic region into two physical sub regions to be combined as the virtual basic regions to hash a basic region using higher two bits (or position information of K bits) as a key value of the basic regions and indexes the lower one bit (or position information of M+N−K bits) with a key value of the sub regions. Therefore, when the virtual basic region is equal to the physical basic region, a storage space for a total of three fault address is required in the physical basic region (or a virtual basic region) 0. However, the provided storage space is limited to two for every basic region, which exceeds a limitation for managing a fault address.

Further, as illustrated in FIG. 8, the analyzing device 200 divides each physical basic region into two physical sub regions to be combined as the virtual basic regions to hash a basic region using lower two bits (or position information of K bits) as a key value of the basic region and indexes the highest one bit (or position information of M+N−K bits) with a key value of the sub region. Therefore, the fault addresses of all virtual basic regions do not exceed two, so that all fault addresses may be stored. In this case, since different physical basic regions are combined, a tag bit may be considered to distinguish a physical basic region corresponding to the address. However, the tag bit may not be used depending on the design of the designer.

Further, for example, information of the hash function may be generated as a vector to set a bit (or position information of K bits) which selects the virtual basic region to be 0 and set a bit (or position information of M+N−K bit) which selects the virtual sub region to be 1.

Further, since a total number of generated virtual sub regions is eight, from log 2(8)=3, lower two bits among bits which are used to index a total of three bits become virtual basic regions. Therefore, in FIG. 8, a value obtained by storing the bit (or position information of K bit) which selects the virtual basic region and the bit (or position information of M+N−K bit) which selects the virtual sub region as a vector is 100.

As described above, in the information storage table configured by a plurality of unit regions, the unit regions which hash the information storage location are mapped to physical basic regions and each of the mapped physical basic regions are divided into a plurality of physical sub regions. Each of the physical sub regions has same size. In this state, a combination of virtual basic regions which satisfy a predetermined target value is checked in all configurable combinations, the position information related with the checked combination of the virtual basic regions which satisfies the target value is stored, and information (or data) corresponding to the position information related with the combination of the virtual basic regions which satisfies the stored target value is stored in the information storage table.

Further, as described above, in the system configured by a plurality of unit regions, each of the physical basic regions is divided into physical sub regions in smaller units and optimal hashing may be applied so that a space necessary to store information is not concentrated in some of unit regions.

Hereinafter, a control method of an analyzing system which manages an information storage table will be described in detail with reference to FIGS. 1 to 12.

Figure 9:
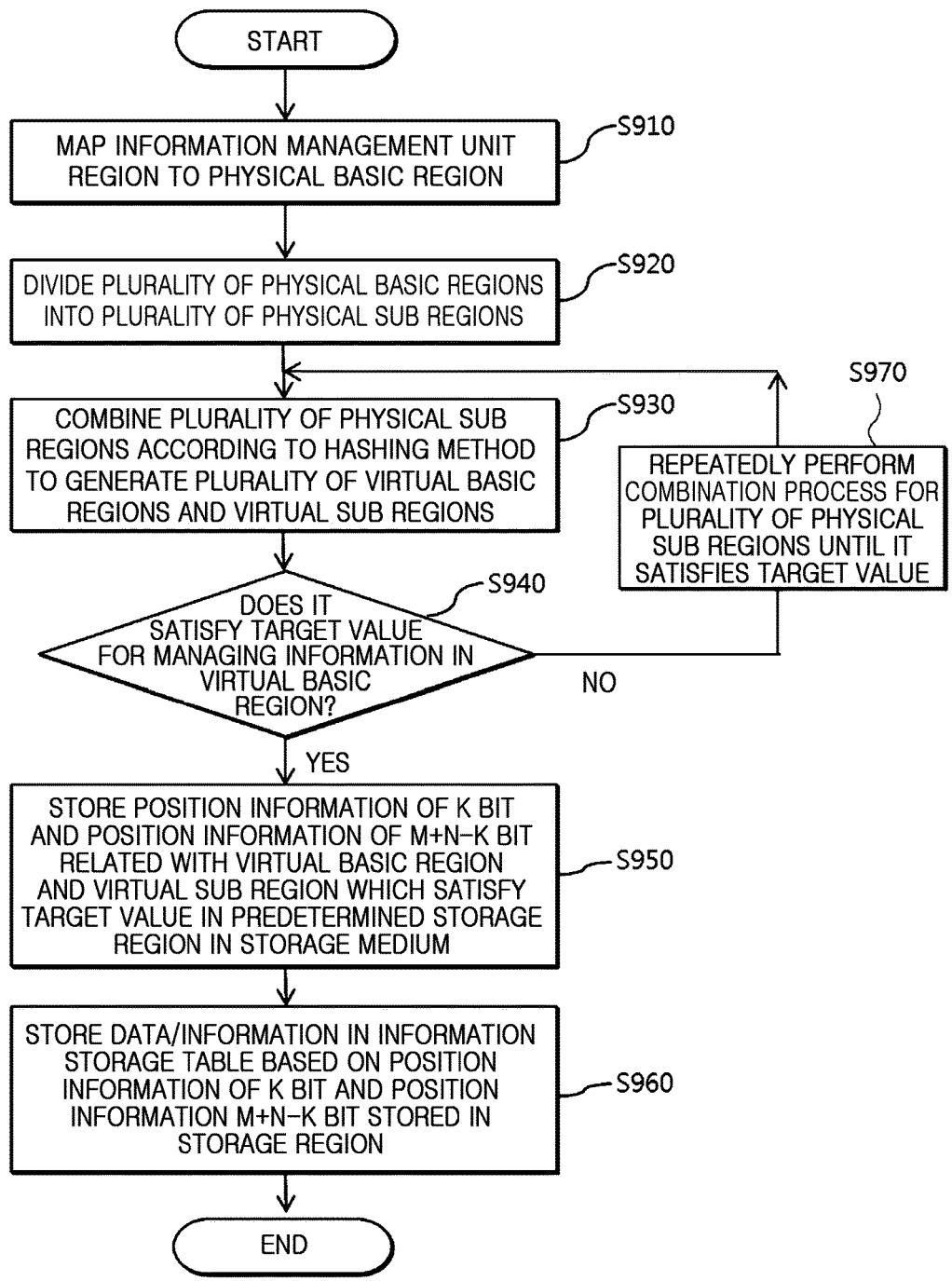
FIG. 9 is a flowchart illustrating a control method of an analyzing system which manages an information storage table.

FIG. 9 is a flowchart illustrating a control method (a method for finding out a hash of an analyzing system including an information storage table configured by a plurality of unit regions) of an analyzing system which manages an information storage table.

First, the analyzing device 200 maps an information management unit regions (or unit regions), which hash the information storage location, to the physical basic regions in the information table 100. Here, the information storage table 110 is included in the storage medium 100 and configured by a plurality of unit regions.

In this case, when unit regions in which the information is to be stored and managed in the memory system such as a DRAM, a PCM, an MRAM, or a SRAM are banks, the analyzing device 200 combines all rows in one bank and divides all the combined rows into $2^M$ physical basic regions and maps the unit regions to the divided $2^M$ physical basic regions.

Further, when the number of unit regions in the storage medium 100 to be managed is not $2^M$, the analyzing device 200 may make a plurality of unit regions in the storage medium 100 to be $2^M$, and then map $2^M$ unit regions to the physical basic regions. Here, M may be a natural number.

For example, the analyzing device 200 maps unit regions in the information storage table 110 to physical basic regions in step S910.

Thereafter, the analyzing device 200 divides the plurality of physical basic regions in the storage medium 100 (or the information storage table 110) into a plurality of physical sub regions having same size.

That is, further, the analyzing device 200 divides the plurality of physical basic regions in the storage medium 100 (or the information storage table 110) into a plurality of physical sub regions having same size. Here, N may be a natural number. In this case, when one physical basic region is divided into N physical sub regions to be hashed, an additional bit may be required to index the physical sub regions.

Figure 2:
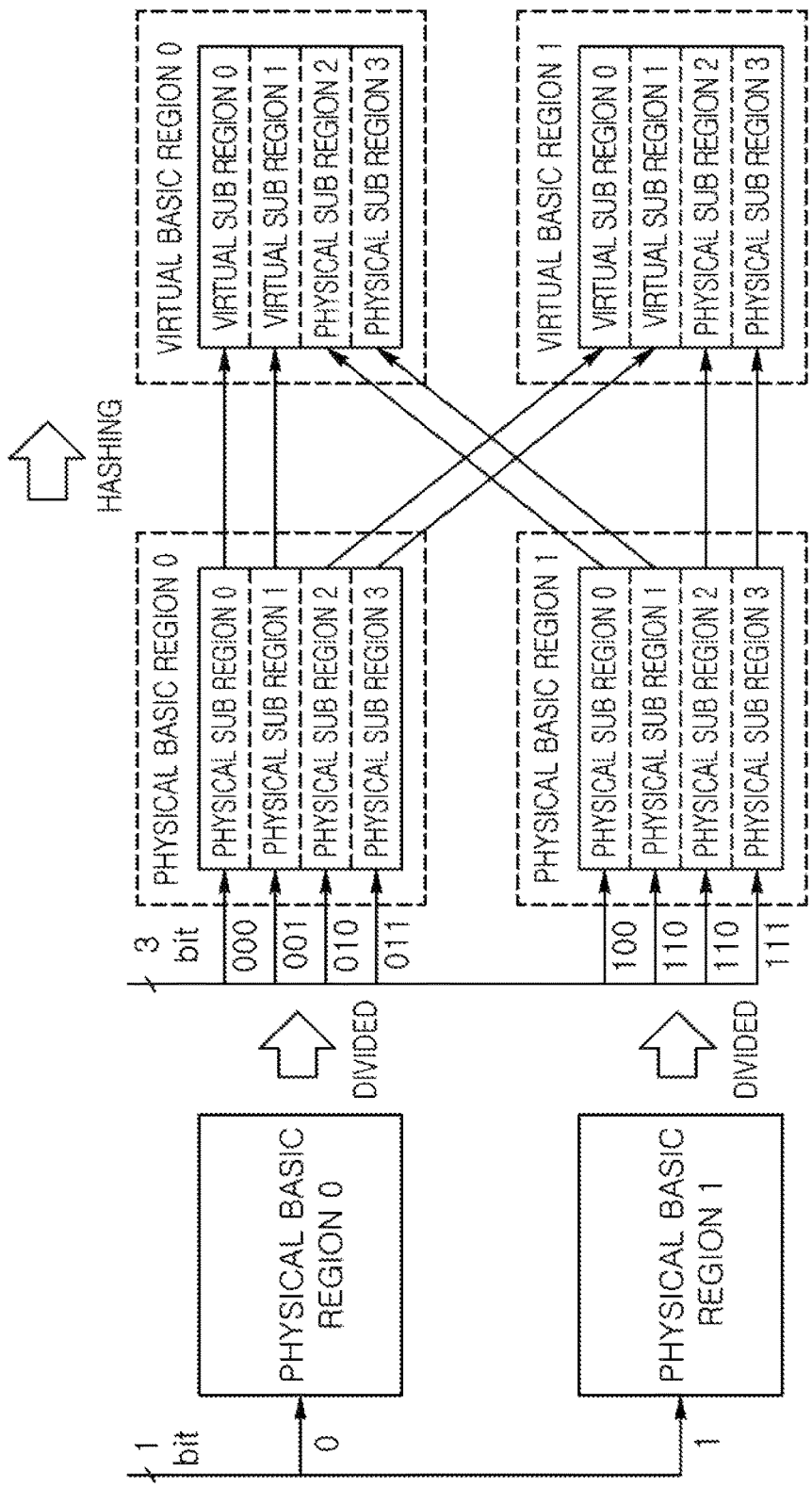
FIG. 2 is a view illustrating an example that divides physical basic regions, which are units hashing an information storage location, into a plurality of physical sub regions having same size.

For example, as illustrated in FIG. 2, the analyzing device 200 divides each of two physical basic regions into four physical sub regions. In this case, the analyzing device 200 requires one bit to hash the physical basic regions and requires two bits (for example, log 2(4)=2) to hash the physical sub regions in each physical basic region. That is, three bits are required to hash a total of eight physical sub regions in step S920.

Thereafter, the analyzing device 200 combines (or configures) $2^{M+N}$ physical sub regions indexed by M+N bits to generate $2^K$ virtual basic regions. In this case, K is a natural number and may be equal to or smaller than M+N. Here, when bits for approaching the physical basic region are M bits and bits for approaching the physical sub region are N bits, a number of combinationable cases to generate the virtual basic region is M+NCM+N−K. Further, the size of K may be a bit rate to approach the information storage table 110.

Further, the analyzing device 200 divides (or resets) the generated $2^K$ virtual basic regions into $2^{M+N-K}$ virtual sub regions having same size.

That is, the analyzing device 200 combines the physical sub regions and sets a key value of the virtual basic regions in the unit of bit which is set in advance from the most significant bit to the least significant bit and sets a bit (or a remaining region) remaining after setting the key value of the virtual basic regions among the M+N bits as a key value of the virtual sub regions to configure the key of the entire virtual regions. The entire virtual regions include virtual basic regions and virtual sub regions. Here, the analyzing device 200 generates position information of the K bits for obtaining the key value of the virtual basic regions and position information of M+N−K bits for obtaining the key value of the virtual sub regions, in order to configure the key (or a key of the entire virtual region) of the virtual regions.

As described above, the analyzing device 200 may configure a hash function for obtaining (or setting) the key value of the virtual basic regions using the position information of the K bits among the M+N bits and for obtaining the key value of the virtual sub regions using position information of a bit remaining after setting the key value of the virtual basic regions among the M+N bits. Here, the hash function provides position information (for example, including position information of K bits and position information of M+N−K bits) related with the virtual basic regions based on physical basic regions addresses.

Figure 10:
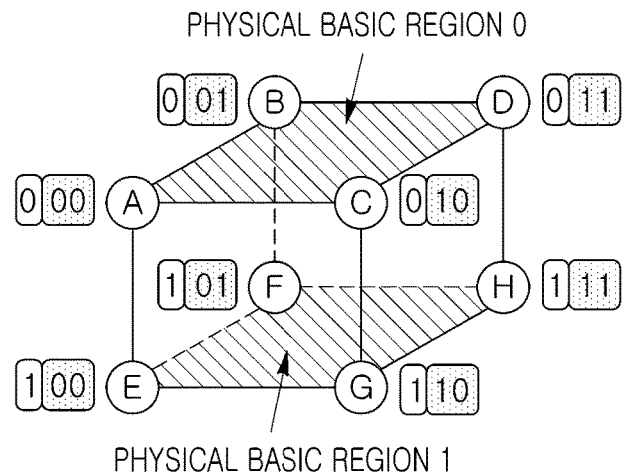
FIGS. 10, 11 and 12 are views illustrating an example of a configuration of virtual basic regions and virtual sub regions in which two physical basic regions are divided into four physical sub regions and combined.
Figure 10:
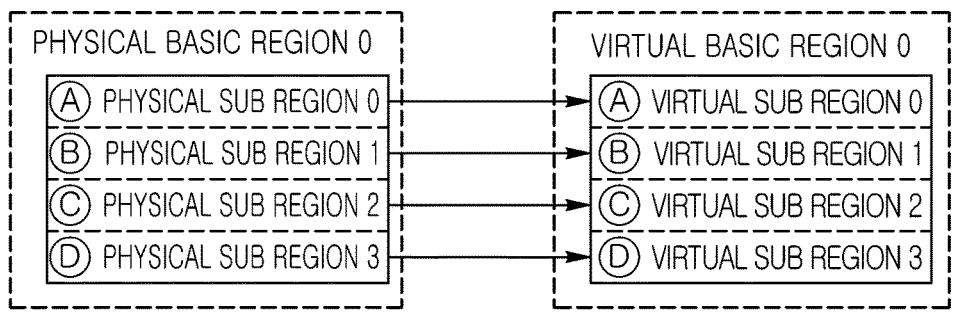
Figure 10:
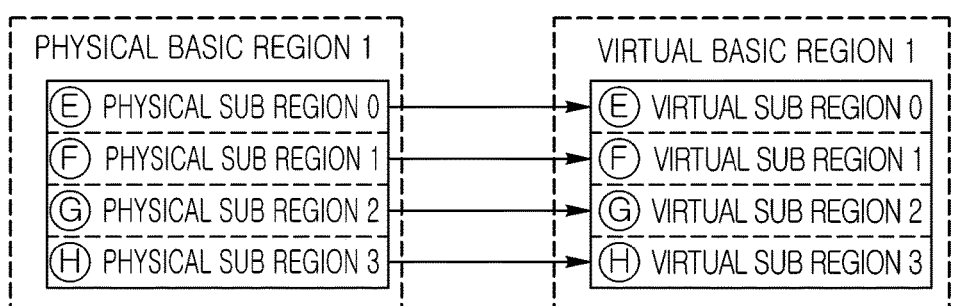

For example, as illustrated in FIG. 10, the analyzing device 200 hashes the highest one bit of three bits for virtual basic regions (or the position of K bit corresponds to the highest one bit) so that a plane combined by physical sub regions 000, 001, 011, and 010 corresponds to a virtual basic region 0 and lower two bits are used to configure a hash key of the virtual sub regions (or the position of M+N−K bits corresponds to lower/lowest two bits). Further, a plane combined by physical sub regions 100, 101, 111, and 110 corresponds to a virtual basic region 1 and lower two bits are used to configure a hash key of the virtual sub regions. In this case, in the above-described combination, the physical basic regions matches the virtual basic regions and the physical sub regions matches the virtual sub regions.

Figure 11:
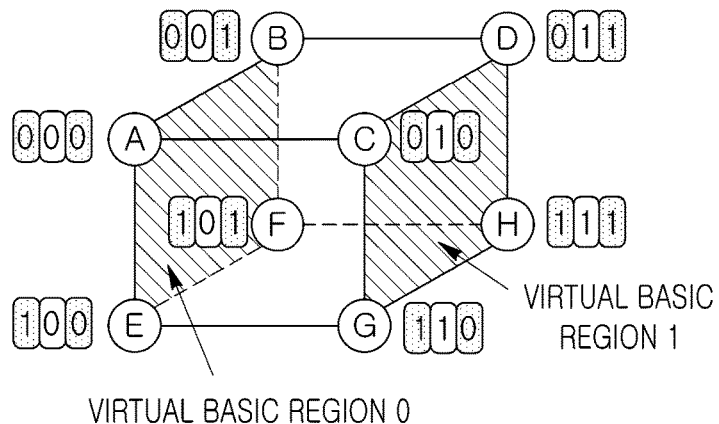
Figure 11:
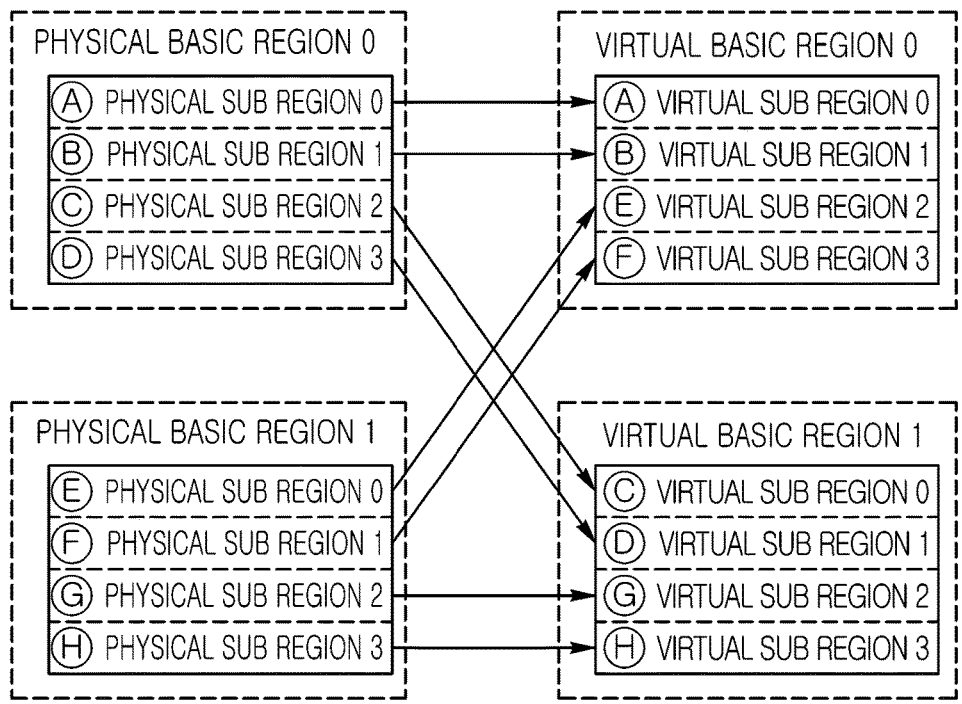

As another example, as illustrated in FIG. 11, the analyzing device 200 hashes a second highest bit of three bits for virtual basic regions (or the position of K bit corresponds to the second one bit) so that a plane combined by physical sub regions 000, 001, 100, and 101 corresponds to a virtual basic region 0 and the highest bit and the lowest bit are used to configure a hash key of the virtual sub regions (or the position of M+N−K bits corresponds to the highest bit and the lowest bit). Further, a plane combined by physical sub regions 010, 011, 110, and 111 corresponds to a virtual basic region 1 and the highest bit and the lowest bit are used to configure hash keys of the virtual sub regions.

Figure 12:
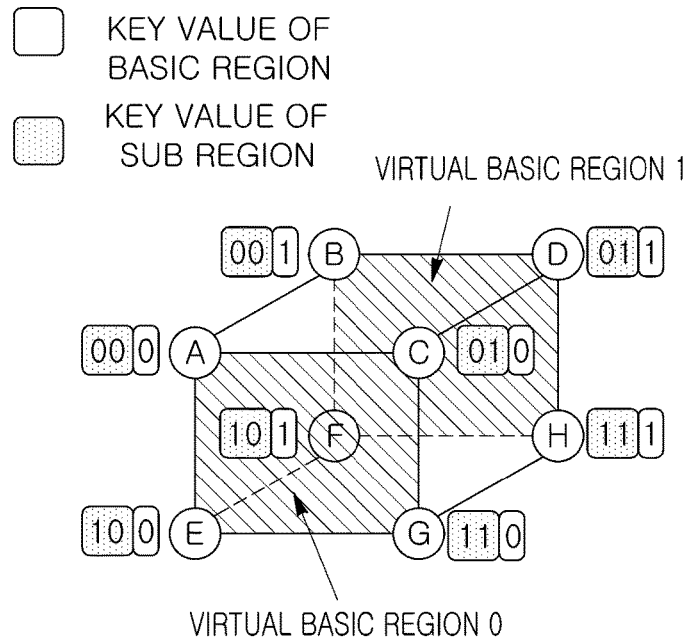
Figure 12:
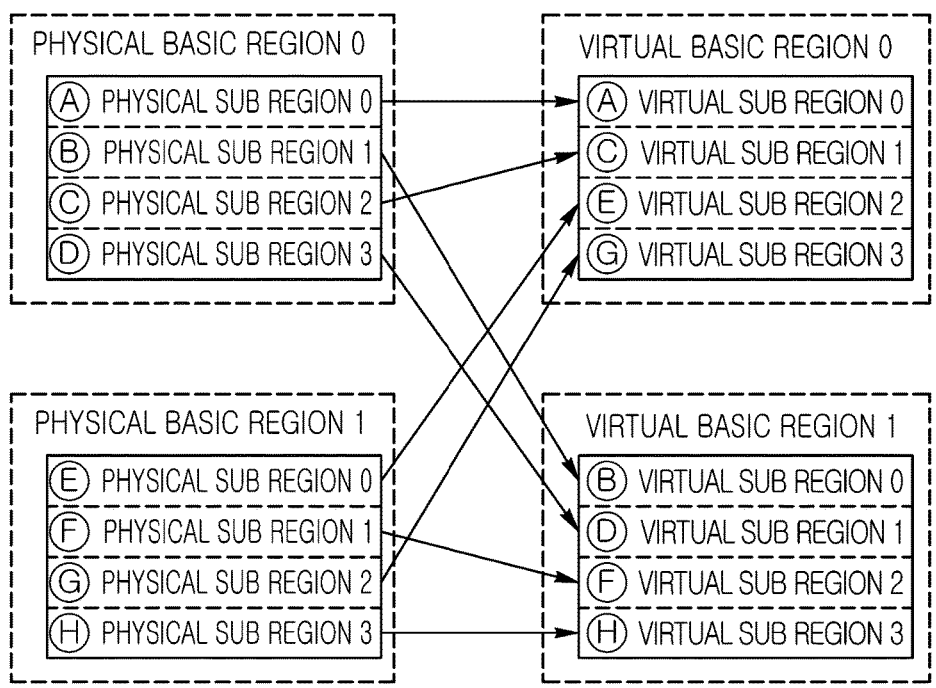

As still another example, as illustrated in FIG. 12, the analyzing device 200 hashes the lowest one bit of three bits for virtual basic regions (or the position of K bit corresponds to the lowest one bit) so that a plane combined by physical sub regions 000, 010, 100, and 110 corresponds to a virtual basic region 0 and higher two bits are used to configure hash keys of the virtual sub regions (or the position of M+N−K bits corresponds to the highest/higher bits). Further, a plane combined by physical sub regions 001, 011, 101, and 111 corresponds to a virtual basic region 1 and higher two bits are used to configure hash keys of the virtual sub regions in step S930.

Thereafter, the analyzing device 200 checks (or determines) whether a number (or a number of combined/recombined information) of information to be stored in the virtual basic regions (or a combination of the virtual basic regions) which is temporarily combined (or configured) satisfies a predetermined target value. Here, the target value is a value (or a value to satisfy the information to be stored) which is set in advance corresponding to information to be stored. In the case of a memory system which applies memory repair (or memory recovery) using a redundant cell, the target value may be a predetermined number (for example, the number of spare rows and the number of spare columns) which is same with the number of available (or available in the memory system) spare cells which are provided in the memory cell. That is, the target value may be a number which is the same with the number of resources which may be available in all of the mapped physical basic regions with a predetermined value corresponding to the information to be stored. Further, in the case of a memory system which avoids a fault memory block, the target value may be a number which is the same with the number of memory blocks which are available in all of the mapped physical basic regions of the memory system.

For example, the analyzing device 200 checks whether the number of information to be stored in the virtual sub region related with the virtual basic region 0 illustrated in FIG. 10 and the virtual sub region related with the virtual basic region 1 satisfies a first target value corresponding to 2 which is the predetermined number of information storage spaces in step S940.

As a checking result (or a determining result), when the number of information to be stored in the combined (or configured/generated) virtual basic regions (or a combination of the virtual basic regions) satisfies a predetermined target value, the analyzing device 200 stores the position information of K bits related with the virtual basic regions which satisfies the target value among the M+N bits and the position information of M+N−K bits related with the virtual sub regions which satisfies the target value in a predetermined (or a pre-allocated) storage region in the storage medium 100. Here, a value of the position information of K bits and a value of the position information of M+N−K bits are configured as a vector and positions of the bits are configured by "0" corresponding to the key value (or a position of K bit) of the virtual basic region and "1" corresponding to the key value (or a position of M+N−K bits) of the virtual sub region.

That is, when the number of information to be stored in the combined (or configured/generated) virtual basic regions (or a combination of the virtual basic regions) satisfies a predetermined target value, the analyzing device 200 generates a position of K bits corresponding to the virtual basic region which satisfies the target value among the M+N bits and a position of M+N−K bits corresponding to the virtual sub region which satisfies the target value. Further, the analyzing device 200 stores the generated position (or position information of K bits) of K bits and the generated position (or position information of M+N−K bits) of M+N−K bits in as a vector in a predetermined storage region in the storage medium 100.

For example, when the number of information to be stored in the virtual sub region related with the virtual basic region 0 illustrated in FIG. 10 and the virtual sub region related with the virtual basic region 1 satisfies the first target value corresponding to 2 which is the predetermined number of information storage spaces, the analyzing device 200 generates a first position information value (for example, including "011") which is a vector configured by "0" with respect to the highest one bit of the virtual basic region (or the position information of K bit) and "1" for a second bit and a third bit of the virtual sub region (or the position information of M+N−K bits) and stores the generated first position information value (for example, including "011") in a first storage region in the storage medium 100 which is set in advance in step S950.

Further, the analyzing device 200 determines that the information storage table 110 may be successfully managed, based on the position information (or position information of K bits related with the virtual basic region which satisfies the target value) of K bits and the position information (or position information of M+N−K bits related with the virtual sub region which satisfies the target value) of M+N−K bits stored in the predetermined storage region in the storage medium 100 and stores data corresponding to the position information of the virtual basic region in the information storage table 110. Here, the data (or information) includes fault information, position information of a fault, routing information, and packet information. Further, the data (or information) may vary depending on a field (for example, including a memory field or a data communication field) to which the analyzing system 10 is applied and may be applied by being modified by a design of a designer. For example, in the case of a memory system which applies a memory repair using a redundant cell, the data (or information) may be a position (or position information) of a fault cell which is replaced by a spare cell which is provided in the memory system.

For example, the analyzing device 200 stores fault information F0 for the virtual region "000", fault information F1 and F2 for the virtual region "001", fault information F3 and F4 for the virtual region "010", and fault information F5 for the virtual region "100" in the information storage table 110 based on the first position information value (for example, including "011") stored in the first storage region in the storage medium 100 which is set in advance in step S960.

Further, as a checking result (or a determining result), when the number of information to be stored in the combined (or configured/generated) virtual basic regions (or a combination of the virtual basic regions) does not satisfy a predetermined target value, the analyzing device 200 repeatedly performs processes of recombining the plurality of physical sub regions according to a predetermined hashing method (or based on a predetermined hash function/with respect to a position of another K bits) excluding a previously combined case (or a plurality of cases combined according to the hashing method/a plurality of recombined cases) among the number of combinationable cases (for example, $M+NC_{M+N-K}$) to check the recombined virtual basic regions and checking whether the number of information to be stored in the checked recombined virtual basic regions satisfies the predetermined target value.

For example, when the number of information to be stored in the virtual sub region related with the virtual basic region 0 illustrated in FIG. 10 and the virtual sub region related with the virtual basic region 1 does not satisfy the first target value corresponding to 2 which is the predetermined number of information storage spaces, the analyzing device 200 recombines the plurality of physical regions so that a plane combined by the physical sub regions 000, 001, 100, and 101 illustrated in FIG. 11 corresponds to the virtual basic region 0 and the highest bit and the lowest bit are used to configure the hash key of the virtual sub region. Further, a plane combined by the physical sub regions 010, 011, 110, and 111 corresponds to the virtual basic region 1 and the highest bit and the lowest bit are used to configure the hash key of the virtual sub region. Further, the analyzing device 200 checks whether the number of information to be stored in the virtual sub region related with the virtual basic region 0 and the virtual sub region related with the virtual basic region 1 which are recombined as illustrated in FIG. 12 satisfies a first target value corresponding to 2 which is the predetermined number of information storage spaces in step S940. When the first target value is satisfied as the checking result, the analyzing device 200 generates a second position information value (for example, including "101") which is configured by "0" for a second bit (for example, corresponding to the position information of K bits) which is the basic region and "1" for the first bit and the third bit (for example, corresponding to the position information of M+N−K) which are the sub regions, stores the generated second position information value (for example, including "101") in a predetermined second storage region in the storage medium 100 and ends the entire processes.

Further, when the target value is not satisfied for all combinations of positions of K bits among M+N bits, the analyzing device 200 determines that the data cannot be stored (or the information storage table 110 cannot be successfully managed) and ends the entire processes in step S970.

As described above, in the information storage table configured by a plurality of unit regions, the unit regions which hash the information storage location are mapped to physical basic regions and each of the mapped physical basic regions are divided into a plurality of physical sub regions having same size. In this state, a combination of virtual basic regions which satisfies a predetermined target value is checked in all configurable combinations, the position information related with the checked combination of the virtual basic regions which satisfies the target value is stored, and information (or data) corresponding to the position information related with the combination of the virtual basic regions which satisfies the stored target value is stored in the information storage table. Thus, the entire information storage space is uniformly utilized for every region, thereby improving performance of the entire system.

Further, as described above, in the system configured by a plurality of unit regions, the physical basic regions are divided into physical sub regions to be a smaller unit and optimal hashing is applied, so that the space which is necessary to store the information is not concentrated in some of unit regions. Therefore, the information storage space required for a specific region is managed together with other regions to increase availability of the entire system without having additional information storage space. Further, a problem in that information which needs to be stored in the information storage table configured by the plurality of unit regions is generated in a small number of specific regions, which lowers the availability of the entire system is solved.

Changes or modifications of the above description may be made by those skilled in the art without departing from the spirit and scope of the present invention. Therefore, the exemplary embodiments of the present invention are provided for illustrative purposes only but not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

According to the present invention, each of the physical basic regions, which are units of hashing an information storage position, is divided into a plurality of physical sub regions having same size. Then, a combination of virtual basic regions which satisfy a predetermined target value is checked from all configurable combinations and a hash value related with the combination of the virtual basic regions which satisfies the checked target value is stored in a predetermined region of a memory. Therefore, even though an information storage space required for every unit region is overloaded, when there is an extra information storage space in another region, the information storage space having an extra space is used to maximize efficiency of the information storage space. Therefore, the system of the present invention may be widely used in an information storage device such as a memory field.

What is claimed is:

1. A control method of an analyzing system which manages an information storage table, the control method comprising:

mapping unit regions which hash an information storage location in the information storage table to $2^M$ physical basic regions, by means of an analyzing device;

dividing each of the $2^M$ physical basic regions into $2^N$ physical sub regions, by means of the analyzing device, each of the $2^N$ physical sub regions having same size;

recombining the divided $2^{M+N}$ physical sub regions to $2^K$ virtual basic regions and dividing each of the $2^K$ virtual basic regions into $2^{M+N-K}$ virtual sub regions, by means of the analyzing device, each of the $2^K$ virtual basic regions having same size and each of the $2^{M+N-K}$ virtual sub regions having same size;

checking whether number of information to be stored in the virtual basic regions satisfies a predetermined target value, by means of the analyzing device;

storing, when the number of information to be stored in the virtual basic regions satisfies the predetermined target value, position information of K bits related with the virtual basic regions which satisfies the predetermined target value among M+N bits and position information of M+N-K bits related with the virtual sub regions which satisfies the predetermined target value in a predetermined storage region in a storage medium, by means of the analyzing device; and storing data corresponding to the position information of K bits and the position information of M+N-K bits stored in the storage region in the information storage table, by means of the analyzing device, wherein M, N, and K are natural numbers and K may be equal to or smaller than M+N; and wherein the mapping of the unit regions to the $2^M$ physical basic regions includes:

performing, when number of the unit regions is not $2^M$, a preprocessing process of mapping an existing unit region to $2^M$ new unit regions, by means of the analyzing device.

2. The control method according to claim 1, wherein the mapping of the unit regions to the $2^M$ physical basic regions includes:

adding, when a basic region which stores and manages information in the memory system is a bank, all rows in one bank to be one, by means of the analyzing device;

dividing all added rows into the $2^M$ physical basic regions, by means of the analyzing device; and mapping the unit regions to the divided $2^M$ physical basic regions, by means of the analyzing device.

3. The control method according to claim 1, wherein the recombining of the divided $2^{M+N}$ physical sub regions to the $2^K$ virtual basic regions and dividing each of the $2^K$ virtual basic regions into the $2^{M+N-K}$ virtual sub regions includes:

combining the divided $2^{M+N}$ physical sub regions and setting a key value of the $2^K$ virtual basic regions in a unit of bit which is set in advance from a most significant bit to a least significant bit among the M+N bits of the $2^{M+N}$ physical sub regions, by means of the analyzing device; and setting a bit remaining after setting the key value of the $2^K$ virtual basic regions among the M+N bits as a key value of the $2^{M+N-K}$ virtual sub regions to configure a key of the entire virtual regions.

4. The control method according to claim 1, wherein the target value is a predetermined value corresponding to the information to be stored and same with a number of resources which are available in all of the mapped physical basic regions.

5. The control method according to claim 1, wherein in a case of a memory system which avoids a fault memory block, the target value is a predetermined value corresponding to the information to be stored and same with a number of memory blocks which are available in all of the physical basic regions of the memory system.

6. The control method according to claim 1, wherein a value of the position information of K bits and a value of the position information of M+N-K bits are configured as a vector and positions of the bits are configured by "0" corresponding to a position of K bit which is a key value of the virtual basic regions and "1" corresponding to a position of M+N-K bits which is a key value of the virtual sub regions.

7. The control method according to claim 1, wherein the storing of position information of K bits and position information of M+N-K bits in the predetermined storage region of the storage medium includes:

generating a position of K bits corresponding to a virtual basic region which satisfies the target value, among the M+N bits, by means of the analyzing device;

generating a position of M+N-K bits corresponding to a virtual sub region which satisfies the target value, by means of the analyzing device; and storing the generated position of K bits and the generated position of M+N-K bits in a predetermined storage area of the storage medium as a vector, by means of the analyzing device.

8. The control method according to claim 1, wherein in a case of a memory system which applies memory repair using a redundant cell, the data is position information of a fault cell which is replaced by a spare cell which is provided in the memory system.

9. The control method according to claim 1, further comprising:

a first step of when as the checking result, the number of information to be stored in the virtual basic region does not satisfy the target value, recombining the plurality of physical sub regions for another position information of K bits, excluding a previously combined case among the number of combinationable cases for the plurality of physical sub regions, by means of the analyzing device, to generate the recombined virtual basic region;

a second step of resetting each of the recombined virtual basic regions to be virtual sub regions with the same size, by means of the analyzing device; and a third step of repeatedly performing the first step and the second step until the number of information to be stored in the recombined virtual basic region satisfies the target value, by means of the analyzing device.

10. The control method according to claim 1, further comprising:

determining, when the target value is not satisfied for all combinations of positions of K bits among M+N bits, that the data cannot be stored and ending entire processes by means of the analyzing device.

11. An analyzing system which manages an information storage table, the analyzing system comprising:

the information storage table which is managed for every unit region; and an analyzing device which maps unit regions which hash an information storage location in the information storage table to $2^M$ physical basic regions, divides each of the $2^M$ physical basic regions into $2^N$ physical sub regions having same size, recombines the divided $2^{M+N}$ physical sub regions to $2^K$ virtual basic regions having same size, divides each of the $2^K$ virtual basic regions into $2^{M+N-K}$ virtual sub regions having same size, checks whether number of information to be stored in the virtual basic regions satisfies a predetermined target value, when the number of information to be stored in the virtual basic regions satisfies the predetermined target value, stores position information of K bits related with the virtual basic regions which satisfies the predetermined target value among M+N bits and position information of M+N−K bits related with the virtual sub regions which satisfies the predetermined target value in a predetermined storage region in a storage medium, and stores data corresponding to the position information of K bits and the position information of M+N−K bits stored in the storage region in the information storage table, wherein M, N, and K are natural numbers and K may be equal to or smaller than M+N; and wherein, when the number of the unit regions is not $2^M$, the analyzing device performs a preprocessing process of mapping an existing unit region to $2^M$ new unit regions.

12. The analyzing system according to claim 11, wherein when a basic region which stores and manages information in the memory system is a bank, the analyzing device adds all rows in one bank to be one, divides all the added rows into the $2^M$ physical basic regions, and maps the unit regions to the divided $2^M$ physical basic regions.

13. The analyzing system according to claim 11, wherein the analyzing device combines the divided $2^{M+N}$ physical sub regions and sets a key value of the $2^K$ virtual basic regions in a unit of bit which is set in advance from a most significant bit to a least significant bit among the M+N bits of the 2M+N physical sub regions and sets a bit remaining after setting the key value of the $2^K$ virtual basic regions among the M+N bits as a key value of the $2^{M+N-K}$ virtual sub regions to configure a key of the entire virtual regions.

14. The analyzing system according to claim 11, wherein the target value is a predetermined value corresponding to the information to be stored and same with a number of resources which are available in all of the mapped physical basic regions.

15. The analyzing system according to claim 11, wherein in a case of a memory system which avoids a fault memory block, the target value is a predetermined value corresponding to the information to be stored and same with a number of memory blocks which are available in all of the physical basic regions of the memory system.

16. The analyzing system according to claim 11, wherein the analyzing device performs a first step of when the number of information to be stored in the virtual basic regions does not satisfy the target value, recombining the physical sub regions for another position information of K bits, excluding a previously combined case among the number of combinationable cases for the physical sub regions to generate the recombined virtual basic regions and a second step of resetting each of the recombined virtual basic regions to be virtual sub regions having same size; and repeatedly performs the first step and the second step until the number of information to be stored in the recombined virtual basic regions satisfies the target value, by means of the analyzing device.

17. The analyzing system according to claim 11, wherein when the target value is not satisfied for all combinations of positions of K bits among the M+N bits, the analyzing device determines that the data cannot be stored and ends entire processes.

* * * * *